(12) United States Patent
Yajima et al.

(10) Patent No.: US 7,708,438 B2
(45) Date of Patent: May 4, 2010

(54) LIGHTING FIXTURE FOR VEHICLE

(75) Inventors: Yasuo Yajima, Isehara (JP); Satoru Okada, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 128 days.

(21) Appl. No.: 11/872,997

(22) Filed: Oct. 16, 2007

(65) Prior Publication Data
US 2009/0073709 A1    Mar. 19, 2009

(30) Foreign Application Priority Data
Oct. 20, 2006    (JP)    ............... 2006-286442

(51) Int. Cl.
*B60Q 1/26* (2006.01)
(52) U.S. Cl. .................. 362/494; 362/516; 362/517; 362/518; 362/546
(58) Field of Classification Search .............. 362/494, 362/516–519, 459, 546
See application file for complete search history.

(56) References Cited

U.S. PATENT DOCUMENTS

| | | | |
|---|---|---|---|
| 5,278,731 A | 1/1994 | Davenport et al. | |
| 5,582,480 A | 12/1996 | Zwick et al. | |
| 6,099,153 A | 8/2000 | Zimmermann et al. | |
| 6,271,750 B1 * | 8/2001 | Brautigam et al. | 340/468 |
| 6,431,738 B1 | 8/2002 | Kondo et al. | |
| 6,558,032 B2 | 5/2003 | Kondo et al. | |
| 6,637,917 B2 | 10/2003 | Schwanz et al. | |
| 6,695,465 B2 | 2/2004 | Apfelbeck | |
| 6,758,582 B1 | 7/2004 | Hsiao et al. | |

(Continued)

FOREIGN PATENT DOCUMENTS

DE    200 01 407 U1    3/2000

(Continued)

OTHER PUBLICATIONS

U.S. Appl. No. 11/905,858, filed Oct. 4, 2007, Yajima et al.

(Continued)

*Primary Examiner*—Jong-Suk (James) Lee
*Assistant Examiner*—Robert J. May
(74) *Attorney, Agent, or Firm*—Foley & Lardner LLP

(57) ABSTRACT

A lighting fixture for a vehicle includes: at least one light source; and a housing including a housing main body and an outer lens. The housing includes a partition wall which partitions a housing space, formed by the outer lens and the housing main body into a housing space exposed portion and a housing space shielded portion which houses and shields the at least one light source. The partition wall includes: at least one opening provided ahead of the at least one light source and through which outputted light passes from the housing space shielded portion to the housing space exposed portion; and at least one reflection wall portion including a reflection surface which reflects the outputted light toward a direction on the side of the vehicle such that an irradiating region of the outputted light is widened, and extending to the housing space exposed portion to shield the at least one light source so as to prevent the at least one light source from being visually contacted from a direction front of the vehicle. The irradiating light is formed by reflected light of the outputted light reflected by the reflection surface and outputted through the outer lens.

14 Claims, 9 Drawing Sheets

U.S. PATENT DOCUMENTS

| | | | |
|---|---|---|---|
| 6,769,798 | B2 | 8/2004 | Mishimagi |
| 6,796,698 | B2 | 9/2004 | Sommers et al. |
| 6,846,101 | B2 | 1/2005 | Coushaine |
| 6,951,415 | B2 | 10/2005 | Amano et al. |
| 7,134,772 | B2 | 11/2006 | Furuya et al. |
| 7,275,841 | B2 | 10/2007 | Kelly |
| 7,293,908 | B2 | 11/2007 | Beeson et al. |
| 7,513,664 | B2 * | 4/2009 | Chou .................. 362/494 |
| 7,607,808 | B2 | 10/2009 | Birman et al. |
| 2002/0101734 | A1 | 8/2002 | Tokida et al. |
| 2003/0169599 | A1 | 9/2003 | Natsume |
| 2005/0225994 | A1 | 10/2005 | Barros et al. |
| 2005/0254251 | A1 | 11/2005 | Chou |
| 2006/0146555 | A1 * | 7/2006 | Inaba .................. 362/494 |
| 2007/0064435 | A1 * | 3/2007 | Weller et al. ........ 362/494 |

FOREIGN PATENT DOCUMENTS

| | | | |
|---|---|---|---|
| EP | 1 077 344 | A2 | 2/2001 |
| EP | 1 304 260 | A1 | 4/2003 |
| EP | 1 338 470 | A2 | 8/2003 |
| JP | 2002-79885 | A | 3/2002 |
| JP | 2004-210236 | A | 7/2004 |
| JP | 2005-047411 | A | 2/2005 |

OTHER PUBLICATIONS

U.S. Appl. No. 11/926,408, filed Oct. 29, 2007, Yajima et al.

Y. Yajima, U.S. PTO Office Action, U.S. Appl. No. 11/926,408, Apr. 2, 2009; 19 pages.

Y. Yajima, U.S. PTO Office Action, U.S. Appl. No. 11/905,858, Jun. 9, 2009, 10 pages.

Y. Yajima, U.S. PTO Notice of Allowance and Fees Due, U.S. Appl. No. 11/926,408, dated Nov. 3, 2009, 10 pages.

Y. Yajima, U.S. PTO Office Action, U.S. Appl. No. 11/905,858, dated Dec. 1, 2009, 9 pages.

Y. Yajima, U.S. PTO Office Action, U.S. Appl. No. 11/905,858, dated Feb. 25, 2010, 12 pages.

* cited by examiner

LIGHTING FIXTURE FOR VEHICLE

PRIORITY CLAIM

The present application is based on and claims priority from Japanese Patent Application No. 2006-286442, filed on Oct. 20, 2006, the disclosure of which is hereby incorporated by reference in its entirety.

BACKGROUND

The present invention relates to a lighting fixture used for vehicle, and, in particular, to a lighting fixture for vehicle preferable for being provided for a door mirror.

Conventionally, as a lighting fixture for vehicle, there is known a lighting fixture for vehicle in which a lighting fixture housing, where a plurality of LEDs (Light-Emitting Diodes) arrayed in a row are provided as a light source inside the lighting fixture housing equipped with an outer lens and a housing main body, is provided in the mirror housing of the door mirror of a vehicle. Such a lighting fixture for vehicle is disclosed, for example, in Japanese Patent Laid-open Publication No. 2002-79885.

Further, some conventional lighting fixtures for vehicle are set that each LED is arranged such that a plurality of irradiating regions, which are formed on an outer lens by outputted light directly heading from the plurality of LEDs to the outer lens, are adjacent at a predetermined gap or less, and all LEDs are simultaneously turned ON so as to satisfy legal standards for treating the LEDs as a single lighting fixture. The lighting fixture for vehicle is treated as a single lighting fixture, and can be used as a direction indicator by allowing each LED to simultaneously blink at predetermined time gap.

However, in the conventional lighting fixture for vehicle, although it is treated as a single lighting fixture, irradiating light is formed by the outputted light directly heading from the plurality of LEDs to the outer lens, and the arranging positions of a plurality of LEDs become locally bright and the plurality of LEDs in a turned-ON state is recognizable in the case of looking at the irradiating light via the outer lens. For this reason, the irradiating light has uneven brightness, and causes the reduction of visual quality the lighting fixture for vehicle during light-ON.

Further, the conventional lighting fixture for vehicle is structured that the outputted light from a plurality of LEDs directly head to the outer lens. For this reason, each LED is visually contacted via the outer lens from the outside of the outer lens during light-OFF, causing the reduction of visual quality of the lighting fixture for vehicle during light-OFF.

SUMMARY

At least one objective of the present invention is to provide a lighting fixture for vehicle that suppresses uneven brightness by which a plurality of light sources in the turned-ON state is recognizable and prevents the light sources from being visually contacted via the outer lens during light-OFF, in the case of looking at the irradiating light via the outer lens.

To achieve these and other advantages and in accordance with the purpose of the invention, as embodied and broadly described herein, the invention provides a lighting fixture for a vehicle provided on a side of the vehicle, the lighting fixture comprises: at least one light source which outputs outputted light; and a housing including a housing main body and an outer lens, the housing main body housing the at least one light source, and the outer lens being provided on the housing main body and through which the outputted light transmits to irradiate a direction on the side of the vehicle as irradiating light, wherein the housing includes a partition wall which partitions a housing space, formed by the outer lens and the housing main body and in which the at least one light source is housed, into a housing space exposed portion located on a side of the outer lens and a housing space shielded portion located on a side of the housing main body and which houses the at least one light source while shielding the at least one light source, wherein the partition wall includes: at least one opening provided ahead of the at least one light source and through which the outputted light passes from the housing space shielded portion to the housing space exposed portion; and at least one reflection wall portion including a reflection surface which reflects the outputted light, outputted from the at least one light source and having passed through the at least one opening, toward the direction on the side of the vehicle through the outer lens in such a manner that an irradiating region of the outputted light is widened, and extending to the housing space exposed portion to shield the at least one light source so as to prevent the at least one light source from being visually contacted from a direction front of the vehicle, and wherein the irradiating light is formed by reflected light of the outputted light reflected by the reflection surface and outputted through the outer lens.

Advantageously, the at least one light source includes a plurality of light sources housed in the housing, the at least one reflection wall portion includes a plurality of reflection wall portious each provided for corresponding one of the light sources, the at least one opening includes a plurality of openings each provided for corresponding one of the light sources, and the irradiating region formed on the outer lens by the reflected light of the outputted light of each of the light sources is arranged to be adjacent to each other at a predetermined gap.

Advantageously, the reflection surface of one of the reflection wall portions that is arranged farthest away from the vehicle reflects the outputted light of corresponding one of the light sources in a direction on a rearward side of the vehicle such that at least a part of the irradiating light is visually contacted from the direction on the rearward side of the vehicle.

Advantageously, the housing is provided for a mirror housing of a door mirror provided on the vehicle.

Advantageously, the at least one light source includes an attachment board to be fixed to the housing main body.

Advantageously, the reflection surface faces the at least one light source and faces in a rear direction of the vehicle.

In addition, the invention provides another lighting fixture for a vehicle provided on a side of the vehicle, the lighting fixture comprises: at least one light source which outputs outputted light; and a housing including a housing main body and an outer lens, the housing main body housing the at least one light source, and the outer lens being provided on the housing main body and through which the outputted light transmits to irradiate a direction on the side of the vehicle as irradiating light, wherein the housing includes a partition wall which partitions a housing space, formed by the outer lens and the housing main body and in which the at least one light source is housed, into a housing space exposed portion located on a side of the outer lens and a housing space shielded portion located on a side of the housing main body and which houses the at least one light source while shielding the at least one light source, wherein the partition wall includes: at least one opening provided ahead of the at least one light source and through which the outputted light passes from the housing space shielded portion to the housing space exposed portion; and at least one reflection wall portion including a reflection surface which reflects the outputted light, outputted from the at least one light source and having passed through the at least one opening, toward the direction on the side of the vehicle through the outer lens in such a manner that an irradiating region of the outputted light is widened, and extending to the housing space exposed portion to shield the at least one opening so as to prevent the at least one opening from being visually contacted from a direction front of the vehicle, and wherein the irradiating light is formed by reflected light of the outputted light reflected by the reflection surface and outputted through the outer lens.

Advantageously, the at least one light source includes a plurality of light sources housed in the housing, the at least one reflection wall portion includes a plurality of reflection wall portions each provided for corresponding one of the light sources, the at least one opening includes a plurality of openings each provided for corresponding one of the light sources, and wherein the irradiating region formed on the outer lens by the reflected light of the outputted light of each of the light sources is arranged to be adjacent to each other at a predetermined gap.

Advantageously, the reflection surface of one of the reflection wall portions that is arranged farthest away from the vehicle reflects the outputted light of corresponding one of the light sources in a direction on a rearward side of the vehicle such that at least a part of the irradiating light is visually contacted from the direction on the rearward side of the vehicle.

Advantageously, the housing is provided for a mirror housing of a door mirror provided on the vehicle.

Advantageously, the at least one light source includes an attachment board to be fixed to the partition wall.

Advantageously, the reflection surface faces the at least one light source and faces in a rear direction of the vehicle.

Advantageously, the at least one opening partially opens an approximately central portion in a vertical direction of the partition wall, the at least one reflection wall portion has a height compatible with the at least one opening, an upper end and a lower end of the at least one reflection wall portion are respectively connected to rib walls protruded from an upper end rim and a lower end rim of the at least one opening.

Advantageously, aluminum is deposited on inside and outside of the at least one reflection wall portion, inside and outside of the rib walls, inside and outside of the rib wall, and an outer surface of the at least one partition wall.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

DETAILED DESCRIPTION

Figure 1:
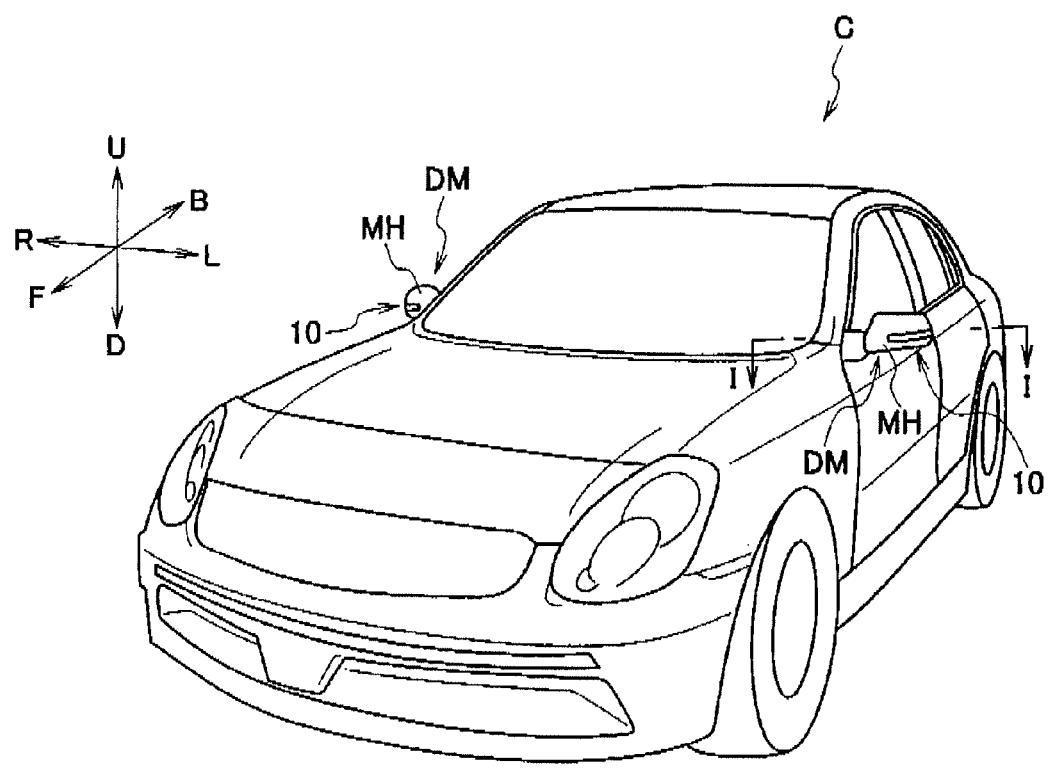
FIG. 1 is a perspective view illustrating a vehicle to which the lighting fixture for vehicle according to an embodiment of the present invention is applied.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

In addition, note that an outer lens 13 (described later) is omitted in FIG. 3, FIG. 4, FIG. 7 and FIG. 8 to make the drawings easily understood. Further, in the following description, as illustrated by an arrow in FIG. 1, the upper direction, the lower direction, the left direction, the right direction, the front direction and the rear direction of an occupant of a vehicle C seated facing ahead the vehicle C are respectively represented in U, D, L, R, F and B, and embodiments will be described according to each direction.

A lighting fixture for vehicle 10 according to an embodiment of the invention, as illustrated in FIG. 1, is provided for a mirror housing MH of a door mirror DM of the vehicle C along the longitudinal direction of the mirror housing MH. The door mirror DM is configured that the mirror housing MH and a mirror M (with reference to FIG. 2) are arranged along the approximate vehicle width direction of the vehicle C when it is used during the driving or the like of the vehicle C. Note that the lighting fixtures for vehicle 10 that are provided for the door mirror DM and the door mirror DM are provided on the both sides of the vehicle C but have basically equal structures except that they are symmetrical, so that description will be made for the lighting fixture for vehicle 10 provided for the door mirror DM on the left side of the vehicle C in the following description, the description for the lighting fixture for vehicle 10 provided for the door mirror DM on the right side of the vehicle C will be omitted.

Figure 2:
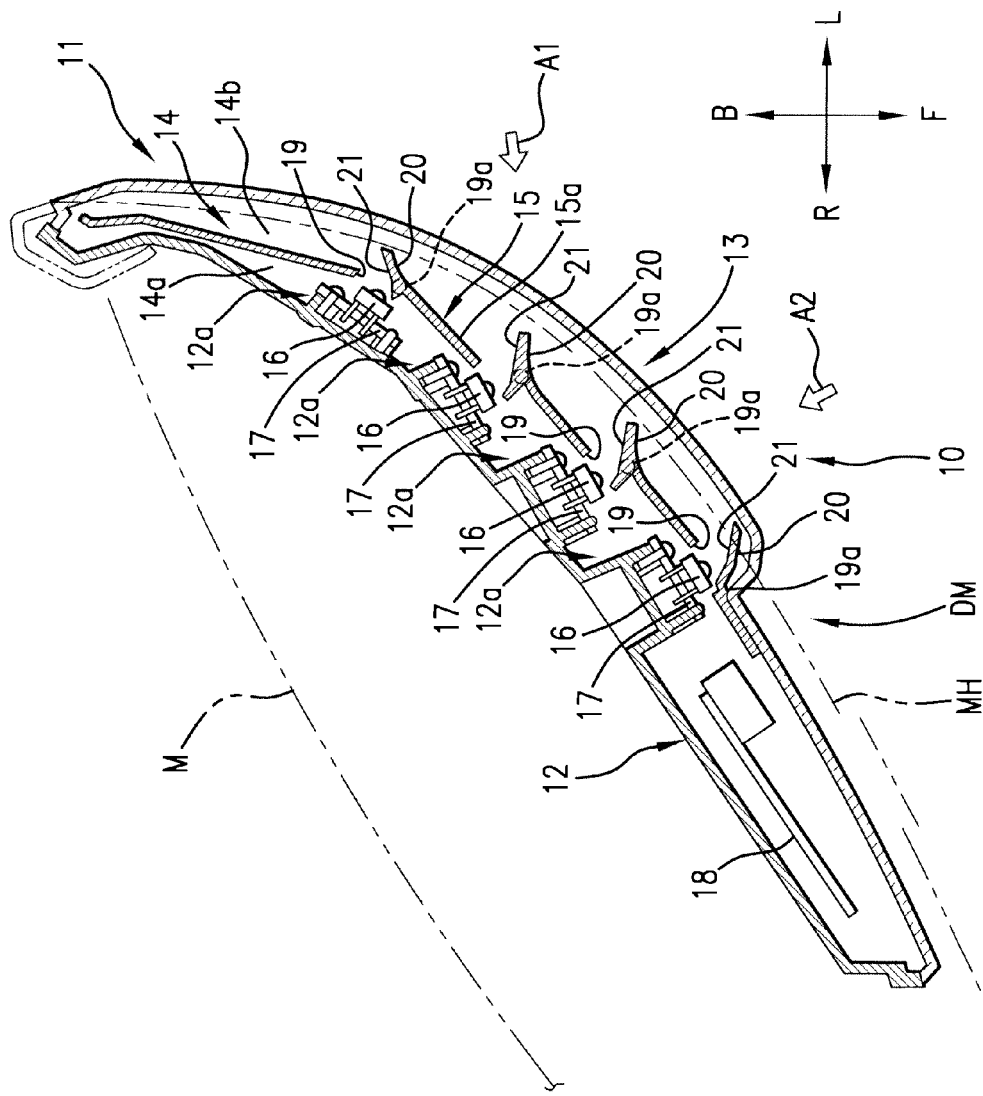
FIG. 2 is a sectional view of the lighting fixture for vehicle according to the embodiment of the present invention obtained along a I-I line illustrated in FIG. 1.

The lighting fixture for vehicle 10 has a housing 11 forming a long shape over the entire body as illustrated in FIG. 2, and the housing 11 is provided along the outer surface of the front side of the mirror housing MH of the door mirror DM as illustrated in FIG. 1. The housing 11 has a housing main body 12 and the outer lens 13. The housing main body 12 forms a long container shape which is attachable in an embedded manner to the mirror housing MH and to which the outer lens 13 is installed.

The outer lens 13 forms a long lid shape and formed by a member which transmits light, and is curved so as to go along the outer surface of the mirror housing MH. Although a structure is employed in the present embodiment in which the outer lens 13 has a transparent structure where the irradiating direction and the light quantity of irradiating light are not adjusted, a structure provided with a prism or the like for adjusting the irradiating direction and the light quantity of irradiating light may be employed. By installing the outer lens 13 to the housing main body 12, a housing space 14 surrounded by the outer lens 13 and the housing main body 12 is configured and established inside the housing 11. The outer lens 13 is formed by a resin material in the present embodiment. Further, in the present embodiment, the housing 11 is attached to the mirror housing MH such that the outer lens 13 is exposed from the outer surface of the mirror housing MH as illustrated in FIG. 1.

A partition wall 15, four LEDs 16 being the light sources, four attachment boards 17 to which the LEDs 16 are attached, and a control board 18 arc provided in the housing space 14 of the housing 11.

The partition wall 15 is provided inside the housing main body 12 so as to bridge an unillustrated ceiling portion 12t (a ceiling portion) and a bottom portion 12b (a floor portion, with reference to FIG. 3) inside the housing main body 12, and partitions the housing space 14 of the housing 11 into a housing space exposed portion 14b on the outer lens 13 side and a housing space shielded portion 14a on the housing main body 12 side.

Figure 3:
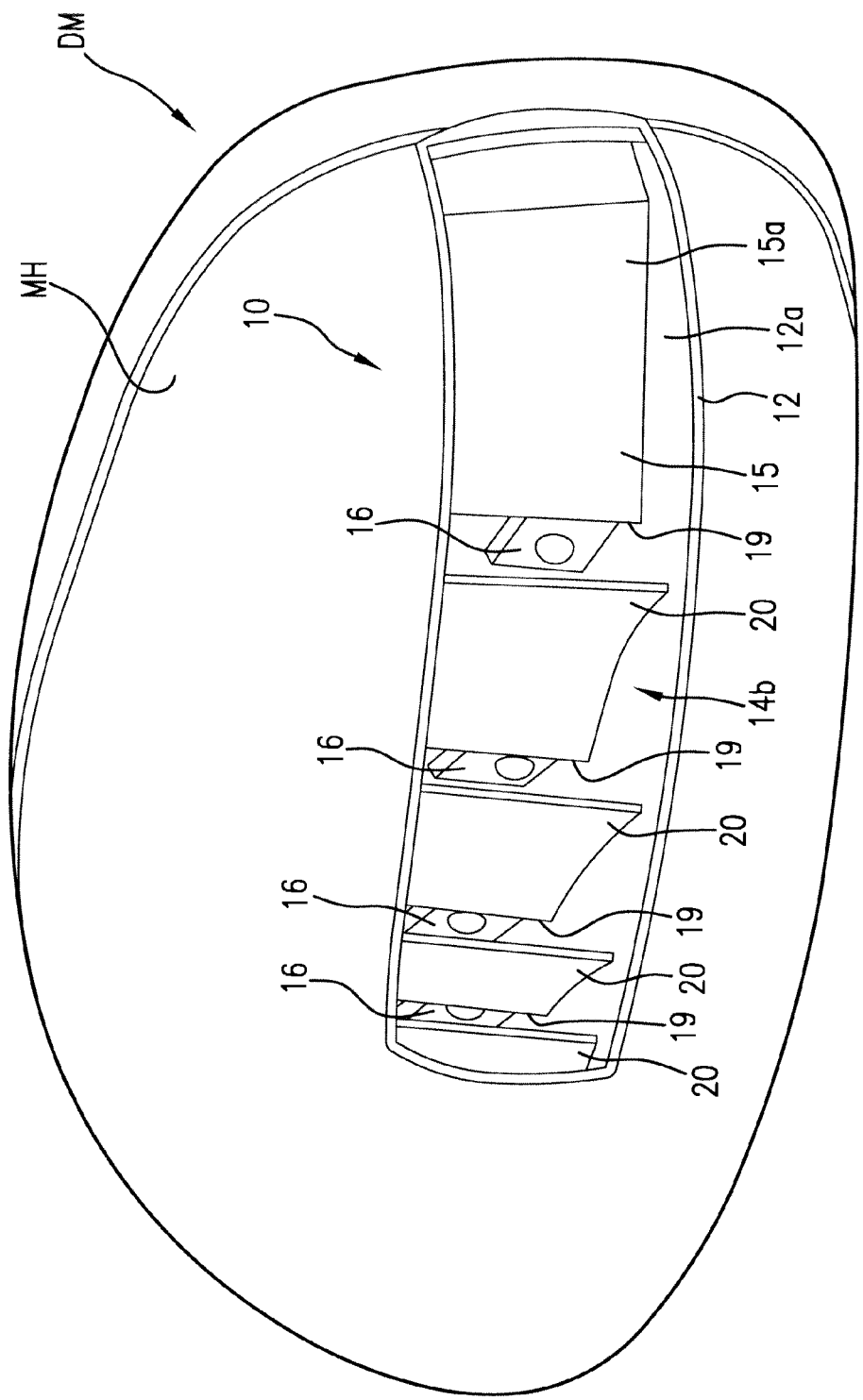
FIG. 3 is a view where the lighting fixture for vehicle illustrated in FIG. 2 is seen from an arrow A1.

Four openings 19 and four reflection wall portions 20 are provided for the partition wall 15. As illustrated in FIG. 2, the four openings 19 are provided at a predetermined gap with each other. As illustrated in FIG. 3, each opening 19 opens from the upper end to the lower end of the partition wall 15. The four reflection wall portions 20 are provided corresponding to the four openings 19.

The four reflection wall portions 20 are formed so as to be continuous on opening rim portion 19a on the left side of each opening 19 of the partition wall 15 and bridge the ceiling portion 12t and the bottom portion 12b inside the housing main body 12 when the partition wall 15 is seen from the outer lens 13 side. A reflection surface 21 to each opening 19 is equipped on each opening 19 side of each reflection wall portion 20. The size, installing position, installing angle or the like of the each reflection wall portion 20 is set based on the positional relation between the opening 19 and the LED 16 corresponding to each reflection wall portion 20, and it will be described later. In the partition wall 15, aluminum for example is deposited on an outer surface 15a facing the outer lens 13 and the reflection surface 21. Further, aluminum for example is deposited on a part of a surface of the housing main body 12 which is on the outer lens 13 side (e.g. the ceiling portion 12t or the bottom portion 12b of the housing main body 12 structuring the housing space exposed portion 14b).

The LED 16 is arranged in each of the four openings 19. The four LEDs 16 are arranged in the housing space shielded portion 14a, and their positions are set such that the outputted light is headed to the reflection surface 21. Specifically, the openings 19 are openings that permit the outputted light from each LED 16 housed in the housing space shielded portion 14a to travel to the housing space exposed portion 14b, and the outputted light having passed through the openings 19 reaches the reflection surface 21. Herein, in the present embodiment, the angle of outputted light where light emission intensity becomes half a peak value is used as an output angle (a so-called viewing angle of LED), and light whose output angle is this output angle or less is treated as the outputted light. The output angle of light may be appropriately set, and is not limited to the present embodiment. Each LED 16 is severally attached electrically and physically to each attachment board 17 individually.

Each attachment board 17 is fixed to an attachment pedestal 12a provided for the housing main body 12. Further, each attachment board 17 is electrically connected to the control board 18 provided in the housing space shielded portion 14a (connection is omitted in the drawing). The control board 18 transmits a control signal to each attachment board 17 in response to the operation of an unillustrated operation section of a direction indicator lever or the like provided in the cabin of the vehicle C in order to perform turn-ON control of the LEDs 16. In the present embodiment, the control board 18 is set to allow each LED 16 to blink at equal timing in response to the operation of the operation section. Thus, the lighting fixture for vehicle 10 functions as a direction indicator.

In the lighting fixture for vehicle 10 of the present embodiment, each reflection wall portion 20, each opening 19 and each LED 16 are provided so as to satisfy the requirements of (a) to (d) below.

Figure 5:
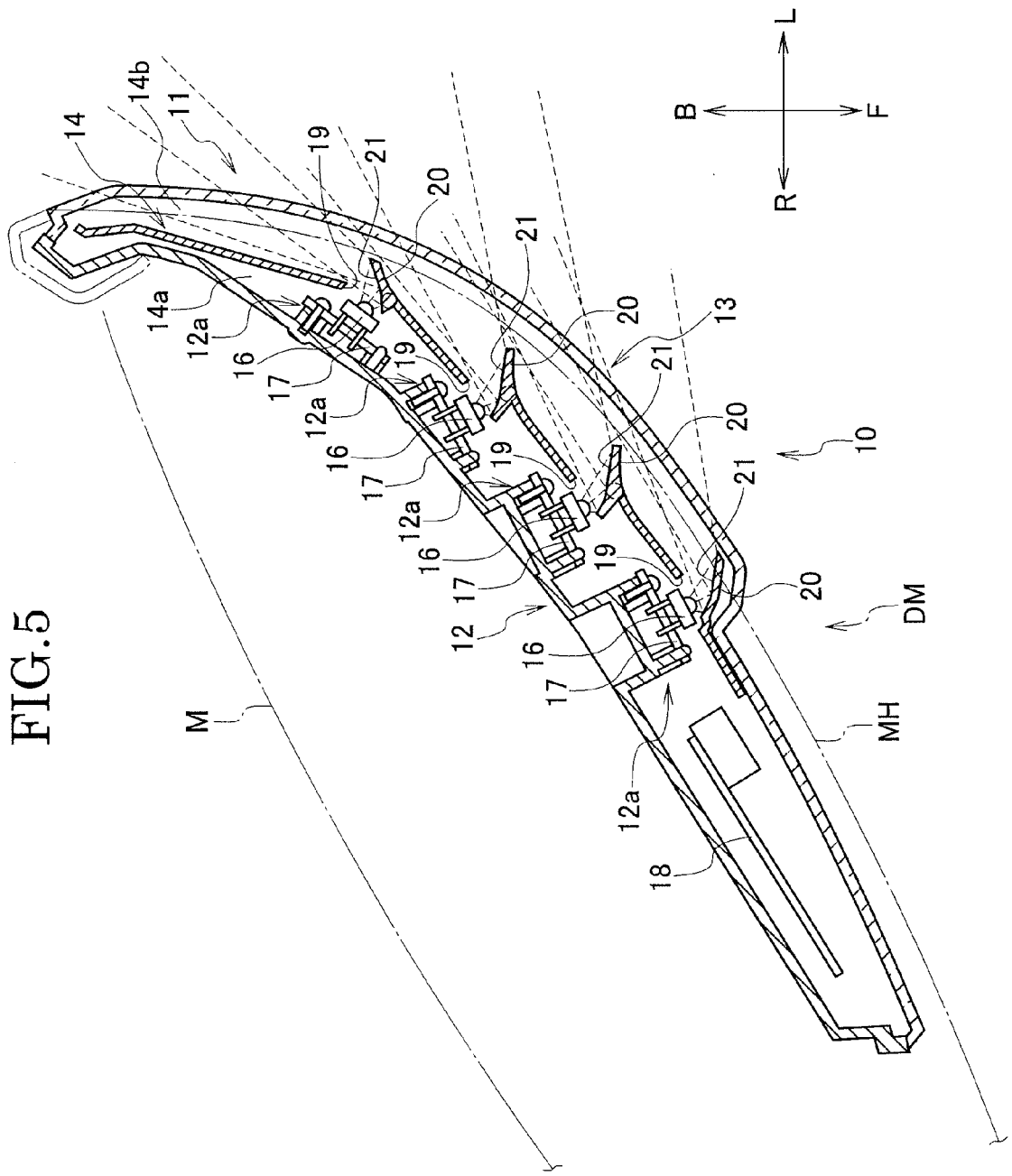
FIG. 5 is a view illustrating outputted light from each LED and irradiating light formed by the outputted light from each LED in the sectional view of FIG. 2.

(a) The positional relation between each LED 16 and each reflection surface 21 of each reflection wall portion 20 is set such that the irradiating region of the outputted light of the LEDs 16 reflected on the reflection surface 21 becomes a region from the left lateral direction to the left rear lateral direction of the vehicle C as illustrated in FIG. 5. Further, the positional relation with each other is set such that the outputted light of the LEDs 16 reflected on the reflection surface 21 reflects the irradiating region in a magnifying manner. Herein, to magnify the irradiating region means that, in the case of comparing an irradiating region by the outputted light directly traveled from the LEDs 16 with an irradiating region of the outputted light of the LEDs 16 reflected on the reflection surface 21 at equal distance points in an optical axis direction of the light sources, the latter is larger than the former.

(b) The positional relation between each LED 16 and each reflection surface 21 of each reflection wall portion 20 is set such that the each irradiating region that the outputted light reflected on each reflection surface 21 forms on the inner surface of the outer lens 13 becomes adjacent at a predetermined gap or less as illustrated in FIG. 5. This requirement is due to the fact that only a single lighting fixture is permitted to install to the door mirror DM in European legal standards, and a lighting fixture using a plurality of LEDs are considered as a single lighting fixture by setting adjacent irradiating regions at a predetermined gap or less.

(c) The positional relation between an LED 16 at the most distant position from the vehicle C (16 out illustrated FIG. 5) and the reflection surface 21 of the reflection wall portion 20 corresponding to the LED is set such that an angle formed by the vehicle C side end portion LT of the irradiating region and the central axis direction CT of the vehicle C becomes a predetermined angle or less as shown in FIG. 5. This requirement is due to the fact that, in the case of using the lighting fixture laterally provided for the vehicle as a direction indicator, the angle formed by the vehicle C side end portion LT of the irradiating region and the central axis direction CT of the vehicle C is required to be a predetermined angle or less (5 degrees or less in Europe, 30 degrees or less in the U.S.) in European and North American legal standards.

Figure 4:
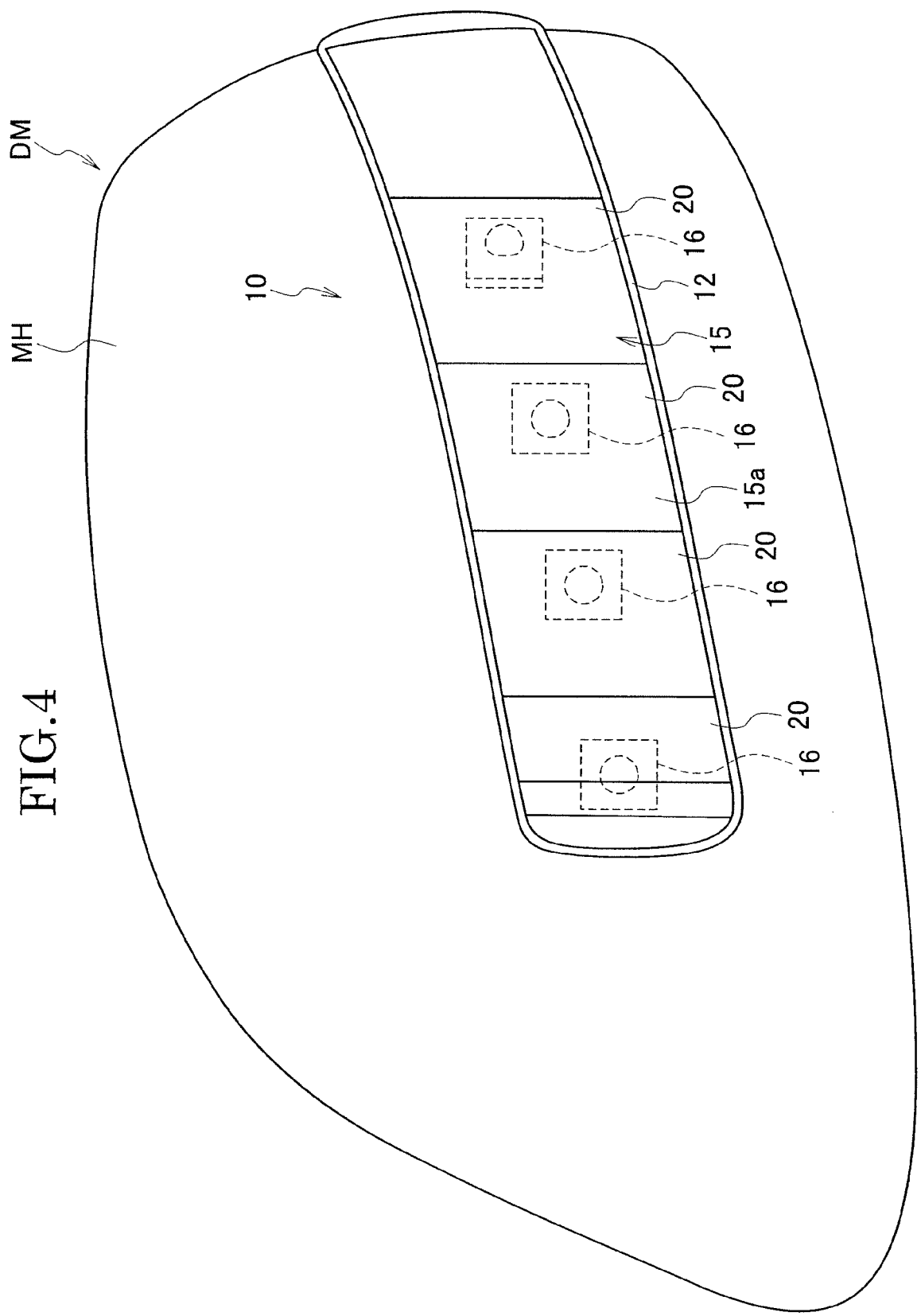
FIG. 4 is a view where the lighting fixture for vehicle illustrated in FIG. 2 is seen from an arrow A2.

(d) Each reflection wall portion 20 is arranged so as to shield the opening 19 and the LED 16 to each reflection wall portion 20 in the case of looking at the lighting fixture for vehicle 10 from the front direction of the vehicle C as illustrated in FIG. 2 and FIG. 4.

In the lighting fixture for vehicle 10 according to the present embodiment, the irradiating region of each LED 16 outside the outer lens 13 is magnified by the reflection wall portion 20, and is larger than the direct irradiating region of each LED 16. For this reason, uneven brightness where each LED 16 in the turned-ON state is recognizable is suppressed, the visual quality of the lighting fixture for vehicle 10 is improved and illumination performance is unproved comparing to the conventional lighting fixture for vehicle.

Further, in the lighting fixture for vehicle 10 according to the present embodiment, since the irradiating light is formed by the reflected light from the reflection wall portion 20, the orientation or the irradiating region of the irradiating light is easily adjustable only by changing the angle and the shape of the reflection surface 21 of the reflection wall portion 20. For this reason, by appropriately adjusting the angle and the shape of the reflection surface 21, it is possible to form continuous irradiating light without uneven brightness over the entire region, easily.

Further, in the lighting fixture for vehicle 10 according to the present embodiment, the reflection wall portions 20 prevent each LED 16 from being seen from the front direction of vehicle. For this reason, visual quality is improved comparing to the conventional lighting fixture for vehicle.

Further, in the lighting fixture for vehicle 10 according to the present embodiment, the reflection wall portions 20 prevent each opening 19 from being visually contacted from the front direction of vehicle. For this reason, visual quality is improved comparing to the conventional lighting fixture for vehicle.

Further, in the lighting fixture for vehicle 10 according to the present embodiment, when looking from the front direction during light-OFF, only the outer surface 15a of the partition wall 15, and the ceiling portion 12t and the bottom portion 12b of the housing main body 12 on which aluminum for example is deposited are visually contacted, so that excellent visual quality is ensured. Specifically, the partition wall 15 functions as a decorative plate that blindfolds the homing space shielded portion 14a inside the housing 11.

Further, since the lighting fixture for vehicle 10 according to the present embodiment satisfies the above-described requirement of (b), it is possible to install the lighting fixture for vehicle 10 to the door mirror DM as a single lighting fixture.

Further, since the lighting fixture for vehicle 10 according to the present embodiment satisfies the above-described requirements of (b) and (c), it is possible to use the lighting fixture for vehicle 10 as a direction indicator.

In the lighting fixture for vehicle 10 according to the present embodiment, since aluminum for example is deposited on the ceiling portion 12t and the bottom portion 12b of the housing main body 12, the outer surface 15a of the partition wall 15, and the reflection surface 21, the housing space exposed portion 14b inside the housing 11, which is visually contacted from outside via the outer lens 13 is configured by the deposition surface of aluminum. For this reason, light entered from outside scatters inside the housing space exposed portion 14b and reflects to the outside of the outer lens 13. Hence, the brilliance of the lighting fixture for vehicle 10 increases, and the visual quality of the lighting fixture for vehicle 10 is improved. Moreover, since the light being scattered inside the housing space exposed portion 14b during light-ON of the LEDs 16 reflects to the outside of the outer lens 13, the brilliance of the lighting fixture for vehicle 10 increases, and hence, it is possible to improve the visual quality of the lighting fixture for vehicle 10 and illumination performance thereof.

As described in the foregoing, according to the lighting fixture for vehicle 10 of the present embodiment of the invention, it is possible to suppress the uneven brightness where each LED 16 in the turned-ON state is recognizable when looking at the irradiating light via the outer lens 13, and is possible to prevent each LED 16 from being visually contacted via the outer lens 13 during light-OFF.

Hereinafter, a lighting fixture for vehicle 210 according to another embodiment of the present invention will be described with reference to FIG. 6 to FIG. 9. In the present embodiment, the structure of a partition wall 215 and the attaching method of each LED 16 are different as compared with the lighting fixture for vehicle 10 described in the above embodiment For this reason, the lighting fixture for vehicle 210 according to another embodiment has basically the equal configuration and operation as the lighting fixture for vehicle 10 of the above embodiment, and therefore, description will be mode only for configurations and operations different thereto.

Figure 6:
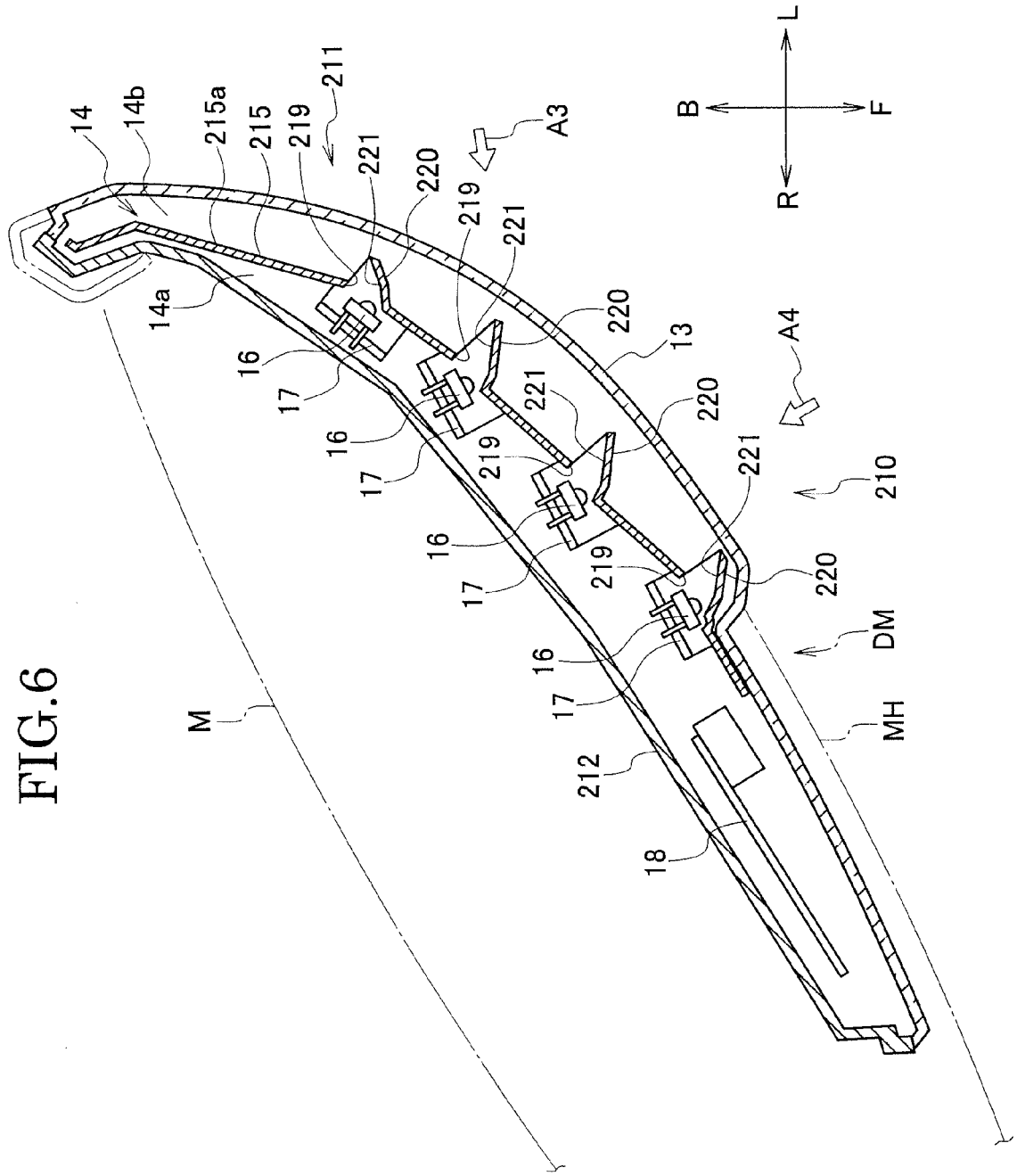
FIG. 6 is a sectional view of the lighting fixture for vehicle according to another embodiment of the present invention, which is obtained along a I-I line illustrated in FIG. 1.

As illustrated in FIG. 6, in the lighting fixture for vehicle 210 according to another embodiment of the invention, a partition wall 215 is provided inside a housing main body 212 so as to bridge an unillustrated ceiling portion 212t (a ceiling portion) and a bottom portion 212b inside the housing main body 212 (a floor portion with reference to FIG. 7), and partitions the housing space 14 of a housing 211 into the housing space exposed portion 14b on the outer lens 13 side and the housing space shielded portion 14a on the housing main body 212 side. The partition wall 215 is provided with four openings 219. The structure of the openings 219 is different from the structure of the openings 19 described in the above embodiment.

Figure 7:
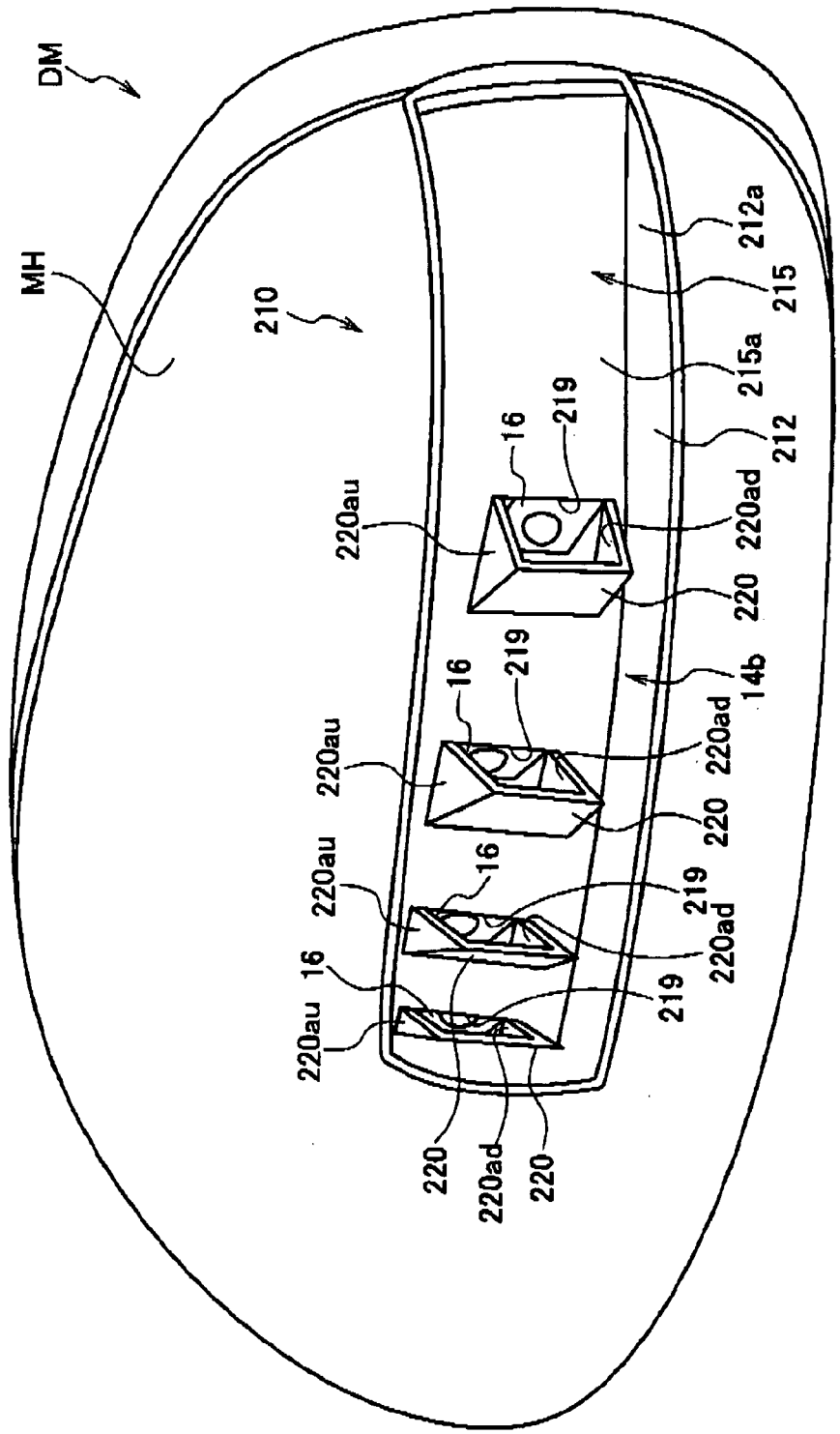
FIG. 7 is a view where the lighting fixture for vehicle illustrated in FIG. 6 is seen from an arrow A3.

Each opening 219 partially opens the approximately central portion in vertical direction of the partition wall 215 as illustrated in FIG. 7. Accordingly, reflection wall portions 220 have a height compatible with the openings 219. The upper end and the lower end of the reflection wall portions 220 are respectively connected to rib walls (220au and 220ad) protruded from the upper end rim and the lower end rim of the opening 219. Aluminum for example is deposited on the inside (reflection surface 221 with reference FIG. 6) and the outside of the reflection wall portions 220, the inside and the outside of the rib walls 220au, the inside and the outside of the rib wall 220ad, and the outer surface 215a of the partition wall 215.

Further, in the lighting fixture for vehicle 210, the attachment boards 17 where each LED 16 is attached is fixed on the partition wall 215 on the rear surface side of the partition wall 215. Accordingly, in the lighting fixture for vehicle 210, the attachment pedestal 12a (with reference to FIG. 2) is not provided for the housing main body 212.

Figure 9:
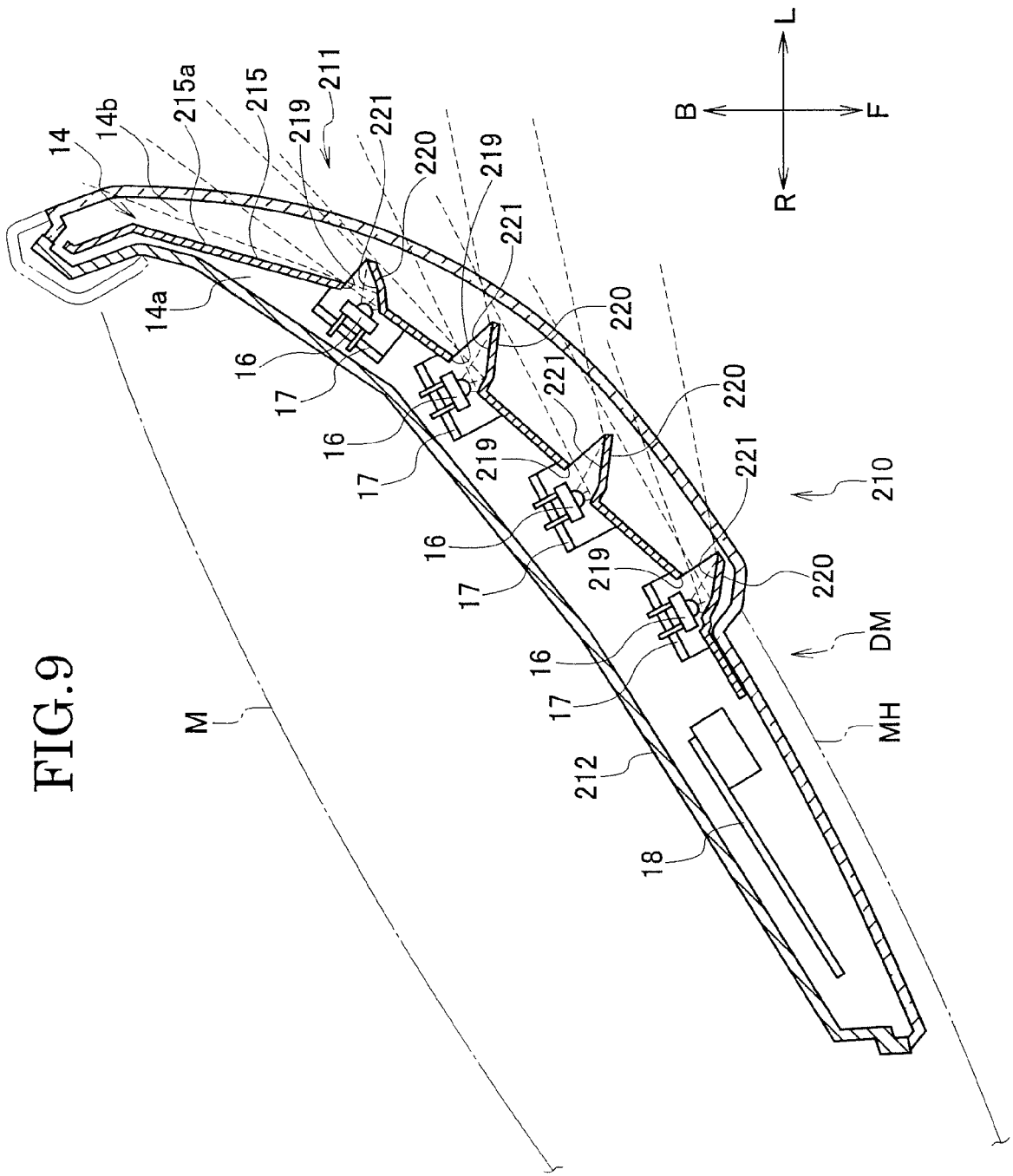
FIG. 9 is a view illustrating outputted light from each LED and irradiating light formed by the outputted light from each LED in the sectional view of FIG. 6.

In the lighting fixture for vehicle 210 according to present another embodiment, similar to the lighting fixture for vehicle 10, irradiating light outputted outward the outer lens 13 is formed by the reflected light of the reflection wall portions 220 (with reference to FIG. 9). Therefore, when looking at the irradiating light via the outer lens 13, uneven brightness where each LED 16 in the turned-ON state is recognizable is suppressed.

Further, in the lighting fixture for vehicle 210, similar to the lighting fixture for vehicle 10, the orientation or the irradiating region of the irradiating light is adjustable only by changing the angle and the shape of the reflection surface 221 on which the reflection wall portion 220 is formed.

Figure 8:
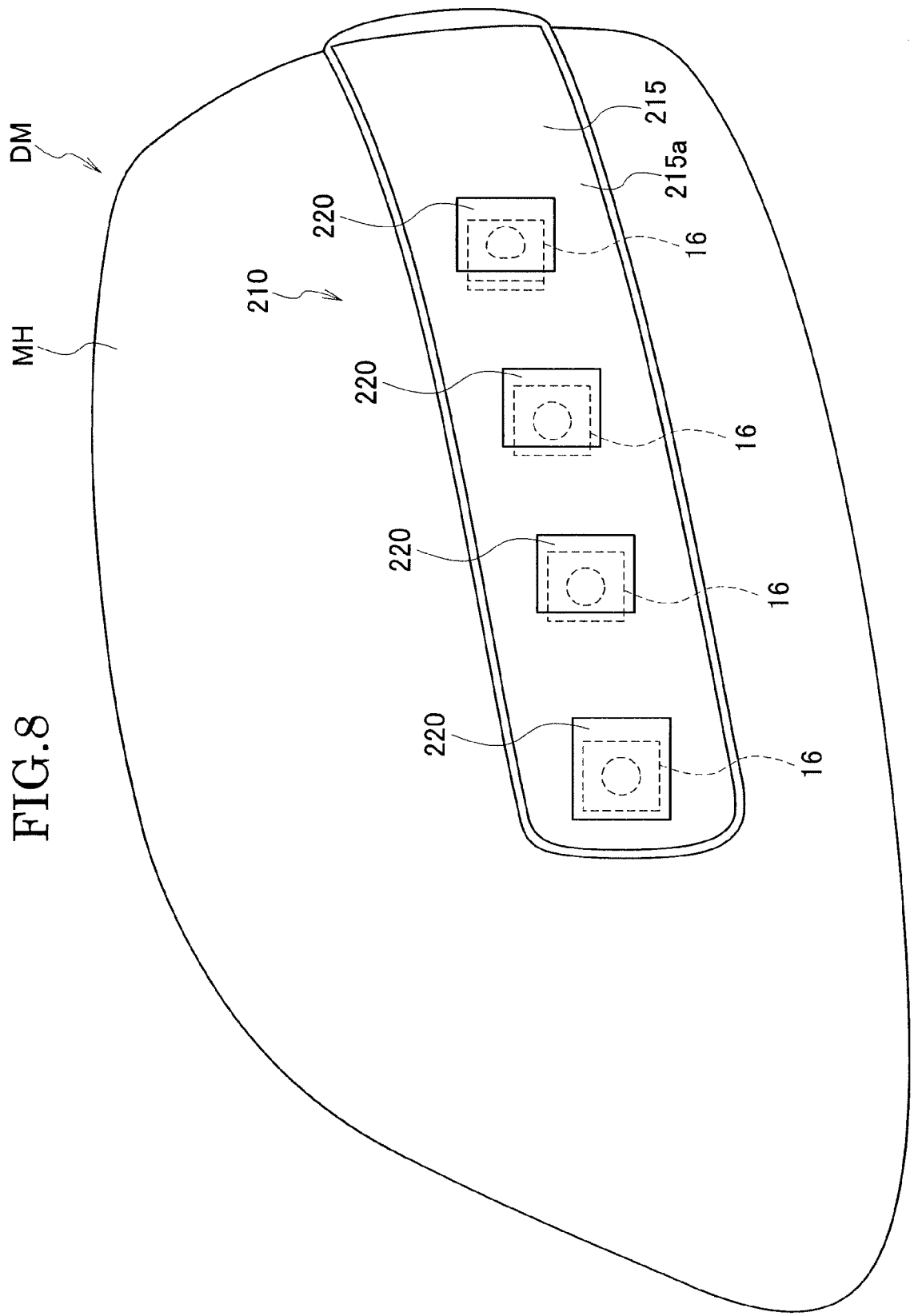
FIG. 8 is a view where the lighting fixture for vehicle illustrated in FIG. 6 is seen from an arrow A4.

Further, in the lighting fixture for vehicle 210, similar to the lighting fixture for vehicle 10, the reflection wall portions 220 prevent each LED 16 from being seen from the front direction of vehicle during light-OFF (with reference to FIG. 8). For this reason, visual quality is improved comparing to the conventional lighting fixture for vehicle.

Further, in the lighting fixture for vehicle 210, similar to the lighting fixture for vehicle 10, the reflection wall portions 220 prevent each opening 219 from being seen from the front direction of vehicle (with reference to FIG. 8). For this reason, visual quality is improved comparing to the conventional lighting fixture for vehicle.

Further, in the lighting fixture for vehicle 210, similar to the fighting fixture for vehicle 10, since only the outer surface 215a of the partition wall 215, the outside of the reflection wall portions 220, the outside of rib walls 220au, the outside of rib walls 220ad, the ceiling portion 212t and the bottom portion 212b of the housing main body 212, where aluminum for example is deposited, are visually contacted when looking from the front direction during light-OFF, excellent visual quality is ensured (with reference to FIG. 8).

Further, since the lighting fixture for vehicle 210 also satisfies the requirement of the above-described (b), it is possible to install the fighting fixture for vehicle 210 to the door mirror DM as a single lighting fixture similar to the lighting fixture for vehicle 10.

Further, since the lighting fixture for vehicle 210 also satisfies the requirements of the above-described (b) and (c), it is possible to use the lighting fixture 210 as a direction indicator similar to the lighting fixture for vehicle 10.

Further, in the lighting fixture for vehicle 210, similar to the lighting fixture for vehicle 10, the housing space exposed portion 14b inside the housing 211, which is visually contacted from outside via the outer lens 13, is structured by the deposition surface of aluminum for example. For this reason, since light entered from outside scatters inside the housing space exposed portion 14b and reflects to the outside of the outer lens 13, the brilliance of the lighting fixture for vehicle 10 increases. Hence, the visual quality of the lighting fixture for vehicle 10 is improved. Moreover, since light being scattered inside the housing space exposed portion 14b during light-ON of the LEDs 16 reflects to the outside of the outer lens 13, the brilliance of the lighting fixture for vehicle 10 increases. Therefore, it is possible to improve the visual quality of the lighting fixture for vehicle 10 and illumination performance.

Moreover, in the lighting fixture for vehicle 210, the attachment boards 17 where each LED 16 is attached are fixed on the partition wall 215 provided with the reflection wall portions 220. Hence, it is possible to set appropriate arranging relationship between each reflection surface 221 corresponding to the rear surface of each reflection wall portion 220 and each LED 16, easily.

As described in the foregoing, according to the lighting fixture for vehicle 210 of another embodiment of the present invention, it is possible to suppress the uneven brightness where each LED 16 in the turned-ON state is recognizable when the irradiating light is viewed via the outer lens 13, and to prevent each LED 16 from being visually contacted via the outer lens 13 during light-OFF.

In the above-described each embodiment, positional relation between the four LEDs 16 and the reflection surface (21, 221) of the reflection wall portions (20, 220) is set such that irradiating regions that the reflected outputted light forms on the inner surface of the outer lens 13 become adjacent to each other at a predetermined gap or less (requirement of the above-described (b)). If legal standards for treating light sources having a plurality of LEDs as a single lighting fixture are different, the positional relation may be appropriately changed. Further, when there is no need to clear such legal standards, the lighting fixture for vehicle (10, 210) does not need to satisfy the requirement of (b). Therefore, the invention is not limited to the above-described each embodiment.

Further, in the above-described each embodiment, the positional relation between the LED 16 at the most distant position from the vehicle C and the reflection surface 21 of the reflection wall portion 20 corresponding to the LED is set such that the angle formed by the vehicle C side end portion LT of the irradiating region of irradiating light and the central axis direction CT of the vehicle C became a predetermined angle or less (requirement of the above-described (c)). In the case where the lighting fixture for vehicle (10, 210) is not used as a direction indicator or in the case where legal standards for using it as a direction indicator are not provided, the lighting fixture for vehicle (10, 210) does not need to satisfy the requirement of (c). Therefore, the invention is not limited to the above-described each embodiment.

Further, although the lighting fixture for vehicle (10, 210) is provided for the mirror housing MH of the door mirror DM in the above-described each embodiment, the lighting fixture for vehicle (10, 210) may irradiate the lateral direction of the vehicle C by irradiating light. Therefore, the attachment positions of the lighting fixture for vehicle (10, 210) are not limited to the attachment position in the above-described each embodiment.

Further, in the above-described each embodiment, when looking at the lighting fixture for vehicle (10, 210) provided for the mirror housing MH of the door mirror DM from the front direction of the vehicle C, the reflection wall portions (20, 220) are provided for the positions of shielding the openings (19, 219), but the reflection wall portions (20, 220) may not shield the openings (19, 219) themselves as long as they shield the LEDs 16 provided for the openings (19, 219). Therefore, the attachment positions of the reflection wall portions (20, 220) are not limited to the attachment positions in the above-described each embodiment.

Further, although the partition wall (15, 215) is provided in the above-described each embodiment, the partition wall (15, 215) may be at a position where the LEDs 16 and the reflection wall portions (20, 220) are provided on a positional relation satisfying the requirements of (a) and (d). Therefore, the shape and the position of the partition wall (15, 215) are not limited to the shape and the position in the above-described each embodiment.

Further, the attachment boards 17 are fixed to the housing main body 12 in the above-described fighting fixture for vehicle 10 according to the embodiment, but they may be fixed to the partition wall 15 as in the lighting fixture for vehicle 210 according to another embodiment. Therefore, the attachment position of the attachment board 17 is not limited to the attachment position according to the embodiment.

Moreover, the attachment boards 17 are fixed to the partition wall 215 in the lighting fixture for vehicle 210 of the above-described another embodiment, but they may be fixed to the housing main body 212 as in the lighting fixture for vehicle 10 according to the embodiment. Therefore, the attachment positions of the attachment boards 17 are not limited to the attachment positions according to another embodiment.

As described in the foregoing, in the lighting fixture for vehicle according to the embodiments of the present invention, since the irradiating light is formed by the reflected light whose irradiating region is widened by the reflection surface, it is possible to suppress the uneven brightness where each light source in the turned-ON state is recognizable in the case of looking at the irradiating light.

Further, in the lighting fixture for vehicle according to the embodiments of the present invention, since the reflection wall portions prevent the light source from being seen contacted from the front direction of vehicle, it is possible to improve the visual quality of the lighting fixture for vehicle.

Further, in the lighting fixture for vehicle according to the embodiments of the present invention, since the reflection wall portions prevent the openings and the light sources from being seen from the front direction of vehicle, it is possible to improve the visual quality of the lighting fixture for vehicle.

Further, in the lighting fixture for vehicle according to the embodiments of the present invention, the irradiating regions that the reflected light of outputted light from a plurality of light sources form on the outer lens are adjacent to each other at a predetermined gap, to satisfy the legal standards for treating them as a single lighting fixture by using the plurality of light sources. Therefore, it is possible to treat the lighting fixture for vehicle as a single fighting fixture.

Further, since the lighting fixture for vehicle according to the embodiments of the present invention satisfies the legal standards for treating it as a single lighting fixture, it is possible to attach the lighting fixture for vehicle to the door mirror DM as a single lighting fixture.

Moreover, in the lighting fixture for vehicle according to the embodiments of the present invention, the irradiating region is provided such that an angle formed by the vehicle side end portion of the irradiating region of irradiating light and the central axis direction of vehicle becomes a predetermined angle or less. Therefore, the lighting fixture for vehicle according to the embodiments satisfies the legal standards for treating it as a direction indicator, so that it is possible to use the lighting fixture for vehicle as a direction indicator.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lighting fixture for a vehicle provided on a side of the vehicle, the lighting fixture comprising:
   a plurality of light sources each of which outputs outputted light; and
   a housing including a housing main body and an outer lens, the housing main body housing the plurality of light sources, and the outer lens being provided on the housing main body through which the outputted light transmits to irradiate in a side direction of the vehicle as irradiating light,
   wherein the housing includes a housing space and a partition wall that partitions the housing space into a housing space exposed portion and a housing space shielded portion, wherein the housing space exposed portion is formed by the outer lens and the housing main body and the housing space shielded portion is formed between the partition wall and the housing main body wherein the housing space shielded portion houses and covers the plurality of light sources,
   wherein the partition wall includes:
      a plurality of openings each of which is provided ahead of a corresponding one of the plurality light sources and through which the outputted light passes from the housing space shielded portion to the housing space exposed portion; and
      a plurality of reflection wall portions each of which is formed continuously on an opening rim portion of a corresponding one of the plurality of openings wherein the reflection wall portion extends to the housing space exposed portion covering each of the light sources corresponding to each of the openings so as to prevent the plurality of light sources from being seen from a direction in front of the vehicle, and each of the reflection wall portions including a reflection surface which reflects the outputted light, outputted from the corresponding light source after passing through the corresponding opening toward the side direction of the vehicle through the outer lens in such a manner that an irradiating region of the outputted light is widened; and
   wherein the irradiating light is formed by reflected light of the outputted light reflected by the reflection surface and outputted through the outer lens.

2. The lighting fixture for the vehicle according to claim 1, wherein:
   the plurality of openings and the corresponding plurality of reflection wall portions are arranged such that, the irradiating regions formed on the outer lens by the reflected light of the outputted light of the light sources are adjacent to each other at a predetermined gap.

3. The lighting fixture for the vehicle according to claim 2, wherein the reflection surface of one of the reflection wall portions that is arranged farthest away from the vehicle reflects the outputted light of corresponding one of the light sources in a direction of a rearward side of the vehicle such that at least a part of the irradiating light is visually contacted from the direction of the rearward side of the vehicle.

4. The lighting fixture for the vehicle according to claim 1, wherein the housing is provided for a mirror housing of a door mirror provided on the vehicle.

5. The lighting fixture for the vehicle according to claim 1, wherein each of the plurality of light sources includes an attachment board to be fixed to the housing main body.

6. The lighting fixture for the vehicle according to claim 1, wherein each of the reflection surface faces the corresponding light source and faces in a rear direction of the vehicle.

7. The lighting fixture for the vehicle according to claim 6, wherein an orientation or the irradiating region of the irradiating light is adjusted by changing an angle and a shape of the reflection surface of the reflection wall portion.

8. A lighting fixture for a vehicle provided on a side of the vehicle, the lighting fixture comprising:
   a plurality of light sources each of which outputs outputted light; and
   a housing including a housing main body and an outer lens, the housing main body housing the plurality of light sources, and the outer lens being provided on the housing main body and through which the outputted light transmits to irradiate in a side direction of the vehicle as irradiating light,
   wherein the housing includes a housing space and a partition wall, that partitions the housing space into a housing space exposed portion and a housing space shielded portion, wherein the housing space exposed portion is formed by the outer lens and the housing main body and the housing space shielded portion is formed between the partition wall and the housing main body wherein the housing space shielded portion houses and covers the plurality of light sources,
   wherein the partition wall includes:
      a plurality of openings each of which is provided ahead of a corresponding one of the plurality of light sources and is located in a central portion of the partition wall in a vertical direction, and through which the outputted light passes from the housing space shielded portion to the housing space exposed portion; and
      a plurality of reflection wall portions each of which has a height that is substantially equal to a corresponding opening and extends to the housing space exposed portion, wherein an upper end and a lower end of the reflection wall portion being respectively connected to rib walls protruded from an upper end rim and a lower end rim of one of each of the corresponding openings, wherein each of the reflective wall portions cover the corresponding opening so as to prevent the plurality of openings from being seen from a direction in front of the vehicle, and each of the reflection wall portions including a reflection surface which reflects the outputted light, outputted from the corresponding light source after passing through the corresponding opening toward the side direction of the vehicle through the outer lens in such a manner that an irradiating region of the outputted light is widened; and wherein the irradiating light is formed by reflected light of the outputted light reflected by the reflection surface and outputted through the outer lens.

9. The lighting fixture for the vehicle according to claim 8, wherein:

the plurality of openings and the corresponding plurality of reflection wall portions are arranged such that the irradiating regions formed on the outer lens by the reflected light of the outputted light of the light sources are adjacent to each other at a predetermined gap.

10. The lighting fixture for the vehicle according to claim 9, wherein the reflection surface of one of the reflection wall portions that is arranged farthest away from the vehicle reflects the outputted light of corresponding one of the light sources in a direction of a rearward side of the vehicle such that at least a part of the irradiating light is visually contacted from the direction of the rearward side of the vehicle.

11. The lighting fixture for the vehicle according to claim 8, wherein the housing is provided for a mirror housing of a door mirror provided on the vehicle.

12. The lighting fixture for the vehicle according to claim 8, wherein each of the plurality of light sources includes an attachment board to be fixed to the partition wall.

13. The lighting fixture for the vehicle according to claim 8, wherein each of the reflection surface faces the corresponding light source and faces in a rear direction of the vehicle.

14. The lighting fixture for the vehicle according to claim 8, wherein aluminum is deposited on inside and outside of each of the plurality of reflection wall portions, inside and outside of the rib walls, and an outer surface of the partition wall.

* * * * *